Feb. 20, 1934.  W. H. FINE  1,947,906
RIVET FASTENER
Filed June 23, 1933

INVENTOR.
William H. Fine
BY Booth & Booth
ATTORNEYS.

Patented Feb. 20, 1934

1,947,906

UNITED STATES PATENT OFFICE 1,947,906

RIVET FASTENER

William H. Fine, Los Angeles, Calif.

Application June 23, 1933. Serial No. 677,233

1 Claim. (Cl. 85—40)

The present invention relates to fastening means of the rivet type especially adapted for setting in compressible material, such for example as wood.

The embodiment of the invention herein shown and described is designed especially for securing wood to metal, as in freight car construction where wood wall and floor boards are secured to exterior metal framing members. It provides a simple, durable and economical fastener; its inner end is flush with the inner surface of the wood; and it makes a tight fit in both metal and wood parts so that shifting of the latter is prevented. Furthermore, it effectively excludes moisture, thereby preventing deterioration of both metal and wood, by being inserted from the outside, by having no threads which would either fit loosely in the hole in the wood or damage the fibers thereof, and by having means upon both the shank of the rivet and the inner face of the washer to compress the fibers of the wood without damage thereto.

These and other objects and advantages of the invention will be apparent from the following description, which should be read with the understanding that the form, construction and arrangement of the several parts may be varied, within the limits of the claim hereto appended, without departing from the spirit of the invention as defined therein.

Reference should be had to the accompanying drawing, in which.

Figure 1:
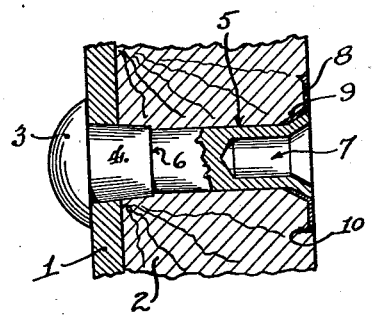
Fig. 1 is a longitudinal partial section of my complete rivet fastener as used to secure a wood member to a metal member.
Figure 2:
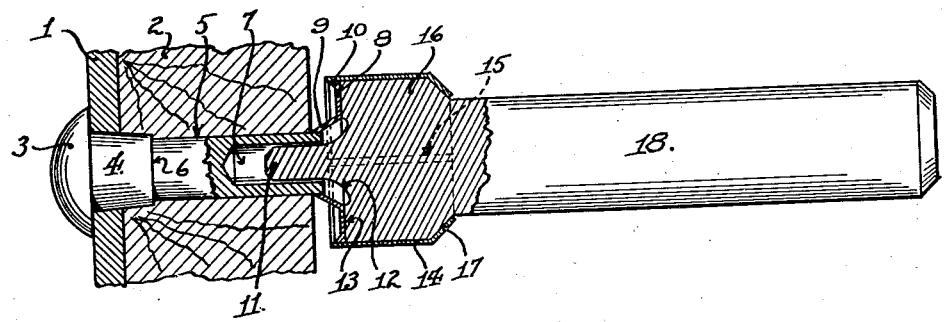
Fig. 2 is a similar view showing the rivet and washer members before setting, and showing also the setting tool.

In the drawing, the reference numeral 1 designates a metal strip such as is used for the exterior framing of a freight car, and 2 is a portion of the wood siding. The rivet member comprises a shank having a head 3 at one end. The shank is composed of two portions differing in diameter as shown at 4 and 5, said portions meeting in an abrupt shoulder 6. The portion 4 of the shank adjacent the head is preferably tapered, as shown in Figs. 1 and 2, the length of the tapered portion being greater than the thickness of the metal member 1, so that said tapered portion and the shoulder 6 extend into and compress the fibers of the wood to make a tight fit and exclude moisture. The hole in the metal member 1, into which the shank fits, is made slightly larger than the hole in the wood member 2.

The reduced portion 5 of the shank to and through its end is tubular, as shown at 7. A washer member 8 is provided on its inner face with a central conical flange 9 which fits closely over the tubular end of the shank. The inner face of said washer is also provided with a second flange 10, preferably at its periphery. When the rivet and washer are set, as in Fig. 1, the central flange 9 expends the hole in the wood, compressing the fibers thereof, and the peripheral flange 10 presses into the wood at the outer edge of the washer, thereby excluding moisture. The tubular extremity of the shank is expanded within the conical flange 9 of the washer 8 to hold it securely. The outer face of the washer, and the expanded end of the shank, are flush with the surface of the wood.

In setting my rivet fastener, the holes in the metal and wood members 1 and 2 are first made so that the rivet is a drive fit therein, and said rivet is then driven in from the outside. The setting is accomplished by a special tool, illustrated in Fig. 2, which has a central guide shank 11 adapted to enter the tubular end of the rivet shank. At its base, said guide shank is enlarged with a gradually increasing taper, as shown at 12, which expands the end of the rivet into the conical central flange 9 of the washer when the tool is struck with a hammer, the head of the rivet being held by the usual bucking bar, not shown.

The washer is initially held by the setting tool, so that it is automatically positioned and driven into the surface of the wood by the same operation that expands the end of the rivet shank. For this purpose, the tool is provided with an annular flat face 13 against which the outer face of the washer rests, and a spring gripping ring 14 which surrounds the periphery of the washer and holds it in its position upon said face 13. The ring 14 is split, as indicated at 15, so that it resiliently grips both the washer and the head 16 of the tool, and is provided with a flange 17 at its rear end which engages a shoulder formed upon the tool between its head 16 and its handle 18. When the washer is thus placed upon the tool, the shank 11 of the latter is inserted into the tubular end of the rivet shank. Then, when the end of the tool is struck with a hammer, the washer is driven into the surface of the wood and the end of the rivet shank is expanded into the conical central flange 9 of the washer. The gripping ring 14 recedes upon the head of the tool as the washer is driven home.

Figure 3:
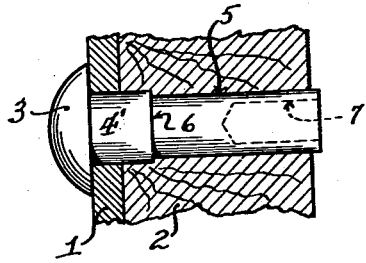
Fig. 3 is an elevation of the rivet alone, showing the portion of the shank adjacent the head slightly modified, being straight sided.
Figure 4:
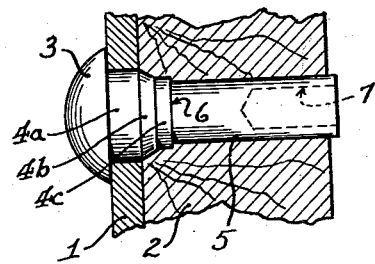
Fig. 4 is an elevation showing another modification of said head portion of the shank.

In Fig. 3, the shank portion 4' adjacent the head of the rivet is shown without taper and in Fig. 4, said portion is elaborated to form a straight section 4a in the frame bar 1, followed by a tapering section 4b and a straight section 4c, both the latter being embedded in the wood siding 2.

If desired the hole on the inside of the wood siding may be enlarged slightly to enable the central flange 9 of the washer to be more easily driven into the wood. To remove the rivet it may be punched out.

I claim:

A rivet fastener comprising a headed shank composed of portions of relatively different diameters, the portion adjacent the head being the thicker, said portions meeting in a shoulder, and the reduced portion being tubular at its outer end; and a washer associated with the tubular end of said shank, said washer having upon its inner face a conical central flange the apex thereof fitting closely upon the exterior of the tubular shank end, and the base thereof being of greater diameter than the normal diameter of said shank end, to enable said central flange to receive and closely embrace the wall of said shank end when said wall is expanded to set the shank and washer together, and said washer having also upon its inner face a penetrative peripheral flange.

WILLIAM H. FINE.